(12) United States Patent
Lord, III et al.

(10) Patent No.: US 7,413,664 B2
(45) Date of Patent: Aug. 19, 2008

(54) SELENIUM REMOVAL PROCESS

(75) Inventors: Charles J. Lord, III, Bartlesville, OK (US); Larry E. Reed, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/639,813

(22) Filed: Dec. 15, 2006

(65) Prior Publication Data

US 2008/0142450 A1  Jun. 19, 2008

(51) Int. Cl.
*C02F 1/58* (2006.01)
*C02F 101/18* (2006.01)

(52) U.S. Cl. .................. 210/721; 210/726; 210/763; 210/904; 210/911; 423/493; 423/509

(58) Field of Classification Search .................. 210/911
See application file for complete search history.

(56) References Cited

U.S. PATENT DOCUMENTS

| 4,405,464 A | 9/1983 | Baldwin et al. ............. 210/717 |
| 4,806,264 A | 2/1989 | Murphy ....................... 210/695 |
| 4,915,928 A | 4/1990 | Marcantonio ................ 423/510 |
| 4,935,146 A | 6/1990 | O'Neill et al. ............... 210/684 |
| 4,940,549 A | 7/1990 | Olsen et al. .................. 210/695 |
| 5,200,082 A | 4/1993 | Olsen et al. .................. 210/667 |
| 5,264,133 A * | 11/1993 | Forschner et al. ........... 210/670 |
| 5,494,582 A | 2/1996 | Goodman .................... 210/631 |
| 5,510,040 A | 4/1996 | Miller et al. ................. 210/721 |
| 5,601,721 A | 2/1997 | Lukasiewicz et al. ........ 210/670 |
| 5,603,838 A | 2/1997 | Misra et al. .................. 210/665 |
| 5,993,667 A | 11/1999 | Overman .................... 210/709 |
| 6,033,572 A * | 3/2000 | Yano et al. ................... 210/631 |
| 6,090,290 A | 7/2000 | Goodman et al. ........... 210/666 |
| 6,093,328 A * | 7/2000 | Santina ........................ 210/679 |
| 6,156,191 A | 12/2000 | Overman .................... 210/96.1 |
| 6,214,238 B1 | 4/2001 | Gallup ......................... 210/717 |
| 6,235,204 B1 | 5/2001 | Castaldi et al. .............. 210/719 |
| 6,251,283 B1 | 6/2001 | Centofanti et al. ........... 210/721 |
| 6,558,556 B1 * | 5/2003 | Khoe et al. ................... 210/758 |
| 6,914,034 B2 * | 7/2005 | Vo ................................. 502/406 |
| 6,994,792 B2 * | 2/2006 | Schlegel ...................... 210/660 |
| 2004/0089608 A1 | 5/2004 | Vo ................................ 210/688 |
| 2005/0059549 A1 | 3/2005 | Vo ................................ 502/406 |
| 2005/0079114 A1 | 4/2005 | Dubrovsky .................... 423/1 |
| 2005/0093189 A1 | 5/2005 | Vo ............................... 264/29.1 |

OTHER PUBLICATIONS

MERSORB® LW Product Data sheet, Selective Adsorption Associates, Inc., found at http://selectiveadsorption.com/mersorblw.htm, date unavailable.
Nucon International Inc. Bulletin 11 B28—Aug. 2004, MERSORB® Mercury Adsorbents Design and Performance Characteristics.

* cited by examiner

*Primary Examiner*—Peter A. Hruskoci
(74) *Attorney, Agent, or Firm*—Bronwyn A. Welvaert

(57) ABSTRACT

A process for removing selenium from an aqueous stream using a supported sulfur material, to convert selenocyanate to selenite, followed by removal of the selenite from the aqueous stream.

13 Claims, No Drawings

SELENIUM REMOVAL PROCESS

The invention relates to an improved process for removing selenium from a water stream. More particularly, the invention relates to the use of a composition containing sulfur and a porous support for the conversion of selenocyanate in an aqueous stream to selenite in the presence of oxygen, and the subsequent removal of selenite from the aqueous stream using a selenite removal system.

SUMMARY OF THE INVENTION

In accordance with this invention, a process for removing selenium from a water stream is provided which includes:
  a) contacting a feed stream comprising water and selenocyanate with a composition comprising sulfur and a porous support, in the presence of oxygen, for conversion of at least a portion of the selenocyanate to selenite, thereby forming an intermediate stream; and
  b) contacting the intermediate stream with a selenite removal system thereby forming a treated stream comprising less selenium than said feed stream.

DETAILED DESCRIPTION OF THE INVENTION

The feed stream of the current invention can be any aqueous stream containing selenocyanate, and is most typically a wastewater stream. The feed stream typically comprises at least about 3000 ppb selenocyanate, more typically at least about 1000 ppb selenocyanate.

The feed stream is contacted, in the presence of oxygen, with a composition comprising, consisting of, or consisting essentially of, sulfur and a porous support for conversion of at least a portion of the selenocyanate to selenite, thereby forming an intermediate stream comprising less selenocyanate and more selenite than the feed stream.

The porous support is selected from the group consisting of an inorganic oxide, carbon and combinations thereof, and more preferably is selected from the group consisting of alumina, carbon and combinations thereof. Most preferably, the porous support is carbon.

The feed stream is contacted with a sufficient quantity of the composition such that at least about 70 wt. %, preferably at least about 80 wt. %, and most preferably at least about 90 wt. % of the selenocyanate is converted to selenite.

The concentration of sulfur of the composition is in the range of from about 10 to about 60 wt. %, preferably from about 10 to about 30 wt. %.

The feed stream preferably comprises at least about 6 ppm oxygen, and more preferably comprises at least about 8.5 ppm oxygen, when contacted with the composition.

The temperature at which the feed stream is contacted with the composition is in the range of from about 20° C. to about 100° C., preferably from about 30° C. to about 80° C.

The intermediate stream is contacted with any selenite removal system known to be capable of removing selenite, thereby forming a treated stream. Such treated stream is then removed from such selenite removal system.

The selenite removal system is selected from the group consisting of copper coprecipitation of the selenite, iron coprecipitation of the selenite, and combinations thereof, and is most preferably iron coprecipitation of the selenite.

The intermediate stream is preferably contacted with a sufficient quantity of the selenite removal system such that the treated stream contains less than or equal to about 30 wt. %, more preferably less than or equal to about 20 wt. %, and most preferably less than or equal to about 5 wt. %, of the selenium contained in the feed stream, on an elemental selenium basis.

The intermediate stream is contacted with the selenium removal system at a temperature in the range of from about 20° C. to about 100° C., preferably from about 30° C. to about 80° C.

The following example illustrates the effectiveness of the inventive process for converting selenocyanate to selenite in an aqueous stream.

EXAMPLE

An aqueous feed stream containing 3090 ppb selenium was contacted with a sulfur/carbon material (about 13 wt. % sulfur) obtained from Nucon International, Inc. referred to as MERSORB®-LW in the presence of about 8.5 ppm oxygen, at about 70° C. and at about 3 GPM/ft². The total selenium and selenium speciation of the influent and effluent streams, after about 23 hours on stream, is set out in the Table below.

TABLE

|  | Influent | Effluent |
|---|---|---|
| Total Selenium | 3090 ppb | 1490 ppb |
| Se Distribution |  |  |
| Selenocyanate (SeCN$^{1-}$) | 99% | 0% |
| Selenite (SeO$_3^{2-}$) | 1% | 99% |
| Selenate (SeO$_4^{2-}$) | 0% | 1% |

As can be seen from the Table, the sulfur/carbon material did remove some of the selenocyanate from the feedstream, and converted the balance of the selenocyanate primarily to selenite. The selenite containing stream can then be sent on to a selenite removal system to remove the selenite.

Whereas this invention has been described in terms of the preferred embodiments, reasonable variations and modifications are possible by those skilled in the art. Such modifications are within the scope of the described invention and appended claims.

That which is claimed:
  1. A process comprising:
     a) contacting a feed stream comprising water and selenocyanate with a composition consisting essentially of sulfur and a porous support, wherein said porous support is selected from the group consisting of alumina, carbon and combinations thereof, in the presence of at least about 6 ppm oxygen, for conversion of at least a portion of said selenocyanate to selenite, thereby forming an intermediate stream; and
     b) contacting said intermediate stream with a selenite removal system, thereby forming a treated stream comprising less selenium than said feed stream.
  2. The process of claim 1 wherein said feed stream comprises at least about 8.5 ppm oxygen when contacted with said composition.
  3. The process of claim 1 wherein said porous support is carbon.
  4. The process of claim 1 wherein said selenite removal system is selected from the group consisting of copper coprecipitation of said selenite, iron coprecipitation of said selenite, and combinations thereof.
  5. The process of claim 1 wherein said selenite removal system comprises iron coprecipitation of said selenite.
  6. The process of claim 1 wherein said feed stream is contacted with a sufficient quantity of said composition such that at least about 70 wt. % of said selenocyanate is converted to selenite.

7. The process of claim 1 wherein said feed stream is contacted with a sufficient quantity of said composition such that at least about 80 wt. % of said selenocyanate is converted to selenite.

8. The process of claim 1 wherein said intermediate stream is contacted with a sufficient quantity of said selenite removal system such that said treated stream contains less than or equal to about 30 wt. % of the selenium contained in the feed stream, on an elemental selenium basis.

9. The process of claim 1 wherein said intermediate stream is contacted with a sufficient quantity of said selenite removal system such that said treated stream contains less than or equal to about 5 wt. % of the selenium contained in the feed stream, on an elemental selenium basis.

10. The process of claim 1 wherein the concentration of sulfur of said composition is in the range of from about 10 to about 60 wt. % sulfur.

11. The process of claim 1 wherein the concentration of sulfur of said composition is in the range of from about 10 to about 30 wt. % sulfur.

12. The process of claim 1 wherein said contacting in steps a) and b) is at a temperature in the range of from about 20° C. to about 100° C.

13. The process of claim 1 wherein said contacting in steps a) and b) is at a temperature in the range of from about 30° C. to about 80° C.

* * * * *